(12) United States Patent
Fortmann

(10) Patent No.: US 8,203,318 B2
(45) Date of Patent: Jun. 19, 2012

(54) METHOD AND ELECTRICITY GENERATING INSTALLATION FOR STABILIZING AN ELECTRICITY DISTRIBUTION NETWORK

(75) Inventor: Jens Fortmann, Berlin (DE)

(73) Assignee: REpower Systems AG, Hamburg (DE)

( * ) Notice: Subject to any disclaimer, the term of this patent is extended or adjusted under 35 U.S.C. 154(b) by 336 days.

(21) Appl. No.: 12/634,400

(22) Filed: Dec. 9, 2009

(65) Prior Publication Data

US 2010/0176770 A1 Jul. 15, 2010

(30) Foreign Application Priority Data

Dec. 18, 2008 (DE) .................. 10 2008 062 356 U

(51) Int. Cl.
*G05F 1/70* (2006.01)

(52) U.S. Cl. ...................................... 323/207

(58) Field of Classification Search .............. 323/205, 323/207, 208; 307/153, 154; 322/24, 28; 209/55

See application file for complete search history.

(56) References Cited

U.S. PATENT DOCUMENTS

| | | | | |
|---|---|---|---|---|
| 2,401,163 | A * | 5/1946 | Keller | 290/40 B |
| 6,023,152 | A * | 2/2000 | Briest et al. | 323/207 |
| 6,525,504 | B1 * | 2/2003 | Nygren et al. | 318/700 |
| 6,600,973 | B1 * | 7/2003 | Folts et al. | 700/297 |
| 6,906,434 | B1 * | 6/2005 | Koeppe et al. | 307/64 |
| 2008/0042442 | A1 | 2/2008 | Richter et al. | |
| 2010/0052322 | A1 | 3/2010 | Fortmann et al. | |
| 2011/0133655 | A1 * | 6/2011 | Recker et al. | 315/159 |

FOREIGN PATENT DOCUMENTS

| | | |
|---|---|---|
| EP | 1892412 | 2/2008 |
| WO | WO-2008-61698 | 5/2008 |

OTHER PUBLICATIONS

Berndt, H. et al. (Aug. 2007). TransmissionCode 2007 Network and System Rules of the German Transmission System Operators. Verband der Netzbetreiber-VDN-e.V. beim VDEW. p. 1-73.

Erlich, I. et al. (2008.) "Measurements of doubly fed induction generator with optimised fault ride through performance." English language abstract. 1 page.

Tapia G. et al. 2002. "A New Simple and Robust Control Strategy for Wind Farm Reactive Power Regulation." *Proceedings of the 2002 IEEE International Conference on Control Applications*, vol. 2: 880-885.

* cited by examiner

*Primary Examiner* — Adolf Berhane
(74) *Attorney, Agent, or Firm* — Morrison & Foerster LLP

(57) ABSTRACT

An electricity generating installation is connected to an electricity distribution network and feeds electrical power into the network via a converter. After detecting a network fault, a stabilization regulator in the installation is activated. The stabilization regulator regulates the voltage of the electrical power as a function of a fed-back voltage signal and has a step-function response that rises over time. After a predetermined time period has elapsed since the activation of the stabilization regulator, the reactive current feed is increased beyond a limit which is provided for normal operation if the network has not stabilized. Accordingly, a converter-fed electricity generating installation, such as a wind energy installation, can help stabilize an electricity distribution network after a network fault.

15 Claims, 4 Drawing Sheets

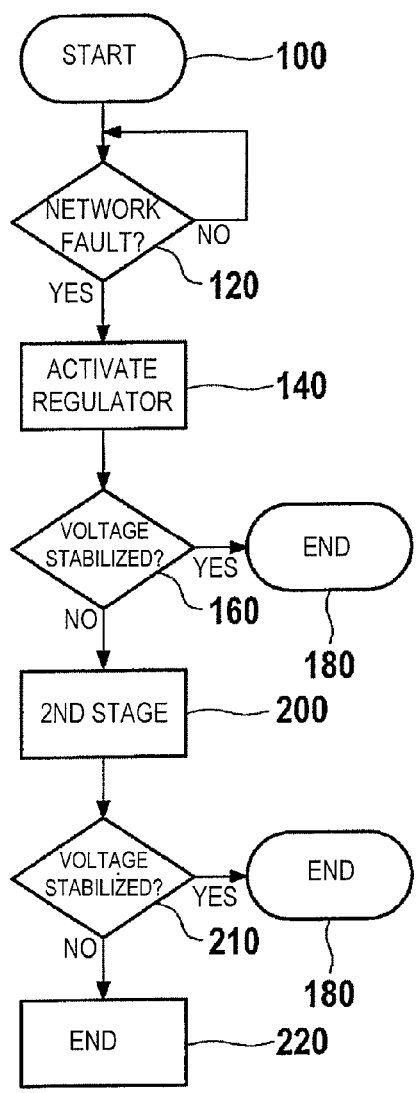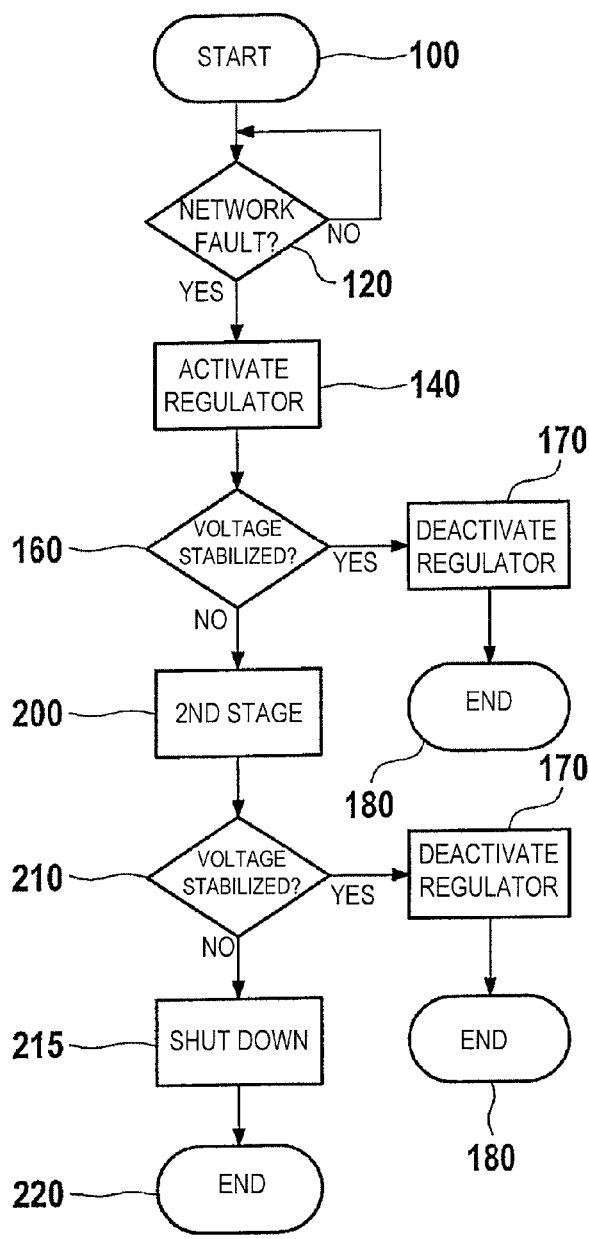

METHOD AND ELECTRICITY GENERATING INSTALLATION FOR STABILIZING AN ELECTRICITY DISTRIBUTION NETWORK

REFERENCE TO RELATED APPLICATIONS

This application claims the priority of German Patent Application No. 10 2008 062 356.3, filed Dec. 18, 2008, the contents of which are incorporated herein by reference.

FIELD OF THE INVENTION

The invention relates to a method for stabilizing an electricity distribution network. An electricity generating installation, in particular a wind energy installation, is connected to the electricity distribution network and feeds electrical power into the electricity distribution network via a converter. In the method, a network fault is detected in the electricity distribution network. The invention also relates to an electricity generating installation which feeds electrical power into an electricity distribution network via a converter and which has a control unit.

BACKGROUND OF THE INVENTION

One frequent cause of a network fault is a short circuit occurring somewhere in the electricity distribution network. A short circuit leads directly to a local voltage dip. Within fractions of seconds, the voltage dip propagates over long distances through the electricity distribution network. The normal reaction to a network fault is to isolate the subelement in which the short circuit has occurred from the rest of the electricity distribution network. Before the subelement with the short circuit is isolated from the rest of the electricity distribution network, the electricity generators have no chance to stabilize the voltage. It is particularly important for the electricity generators not to be isolated from the electricity distribution network during this phase.

One critical factor for the further stability of the electricity distribution network is the phase shortly after the subelement with the short circuit has been isolated from the rest of the electricity distribution network. Although the voltage in the electricity distribution network then rises quickly again, it does not, however, rise immediately to the nominal voltage but first of all to a value of, for example, 75% of the nominal voltage. While the network is any case in a critical state because of the low voltage, control mechanisms can lead to the stabilization process being made even more difficult. This is true, for example, when the stepping switches on the load side change the step-up ratio to the high-voltage network, in order to allow the loads to be supplied with the nominal voltage again. The change in the step-up ratio results in an increase in the current in the high-voltage network, and therefore in a further fall in the voltage in the high-voltage network. Switching of the stepping switches on the load side therefore leads to a positive-feedback effect, which acts against complete reproduction and stabilization of the electricity distribution network. This positive-feedback (destabilizing) effect is particularly problematic because the synchronous generators which are responsible for the basic load are able only to a very restricted extent during this phase to provide the reactive current which is required to support the voltage.

SUMMARY OF THE INVENTION

The invention is based on the object of providing a method and an electricity generating installation which make an increased contribution to once again stabilizing the electricity distribution network after a network fault has been discovered. Against the background of the prior art cited initially, the object is achieved by the features broadly disclosed herein. Advantageous embodiments are specified in the disclosure.

In the method according to the invention, after a network fault has been detected, a stabilization regulator in the electricity generating installation is activated, the step-function response of which stabilization regulator rises continuously over time and which regulates the voltage of the electrical power fed in, as a function of a fed-back voltage signal. Once a predetermined time period has elapsed after the activation of the stabilization regulator, a check is carried out to determine whether the voltage has stabilized. If the voltage has not yet stabilized adequately, the reactive current feed is increased beyond a limit which is provided for normal operation.

First of all, a number of terms will be explained. At the moment, converter-fed electricity generating installations are primarily those in which the energy is obtained from so-called renewable energy sources. In particular, the electricity generating installation may be based on wind energy, solar energy, biomass, or thermal energy. Converter-fed electricity generating installations are also used for pumped storage power stations, in which a variable rotation speed is desirable for the primary power production (in this case the turbines). A further field of use is power stations which feed networks at a different frequency when, for example, a portion of the power is intended to be fed into a railway network, and another portion is intended to be fed into the normal electricity network. The invention therefore also covers electricity generating installations which feed only a portion of the electrical power generated into the power distribution network. The converter makes it possible to set the voltage and phase of the electrical power fed into the electricity distribution network largely independently of the actual electricity that is generated.

The term network fault relates to a major voltage dip and not to fluctuations which occur, for example as a result of stepping switches, during normal operation. The expression a network fault is used in particular when the voltage differs from the rated voltage by more than 10%, in particular when the voltage dips by more than 10% in less than 1 ms.

Even if the short circuit occurs well away from the electricity generating installation, the network fault is generally detected because of a voltage dip at the electricity generating installation. This is because the voltage dip caused by the short circuit propagates within fractions of seconds over long distances through the electricity distribution network. For this reason, the detection of a local voltage dip is generally the quickest possible way for the electricity generating installation to obtain knowledge about a short circuit. The invention also covers the possibility of the message relating to the short circuit being passed to the electricity generating installation in a different manner.

After the detection of a network fault, a stabilization regulator is activated in the electricity generating installation. The stabilization regulator is a component of a closed control loop and is not activated during normal operation. A signal relating to the voltage of the electrical power fed in is fed back and is compared with a nominal voltage as a reference variable. The difference between the two values is supplied as an input variable to the stabilization regulator. The voltage is influenced via the converter by the output variable from the stabilization regulator. The output signal from the stabilization regulator is referred to as the step-function response when the input variable suddenly changes from zero to a constant value. In the case of a stabilization regulator whose step-function response rises over time, the output variable therefore rises over time when the input variable remains constant.

The method according to the invention is based on a number of known factors. Firstly, the electricity distribution network is in a critical state after the network fault and a decision is made within a short time as to whether this will lead to a total failure or whether stabilization will be successful. Secondly, the critical state results in the probability of oscillatory instability, that is to say of oscillations at the network frequency, rising. Thirdly, the decision on the reaction of the electricity generating installation must be made on the basis of very incomplete information. The electricity generating installation notices that the voltage has dipped, but has no other information, or the information available is not sufficiently reliable.

The method according to the invention proposes a two-stage process for this purpose. In a first step, the stabilization regulator is activated after the detection of the network fault. Although the discrepancy between the actual value and nominal value of the voltage is frequently large at this time, the stabilization regulator should nevertheless not cause a sudden change. This is because sudden changes increase the risk of oscillatory instabilities. If the discrepancy between the actual value and the nominal value lasts for a period of time, then this is an indication that the immediate stabilization of the electricity distribution network has not been successful.

The electricity generating installation should then feed as much reactive current as possible in, in order to support the voltage. According to the invention, this is achieved by using a stabilization regulator with a rising step-function response. This avoids sudden initial changes, but has a major effect when a discrepancy between the actual value and the nominal value persists.

Once the stabilization regulator has been active for a time period, a check is carried out to determine whether this measure has led to stabilization of the voltage. If this is not the case, the second stage of the method is initiated. While all the prerequisites from normal operation are still maintained in the first stage, that is to say for example overvoltages are avoided and the feed of real power is maintained, a limit which is provided for normal operation is raised in the second stage, in order to make it possible to increase the reactive current that is fed in. The background to this is that a critical situation and a serious fault must be assumed when adequate stabilization of the electricity distribution network has not yet been successful by this time. The invention therefore proposes a method to react in an appropriate manner to the network fault, despite unstable network states and an unreliable information base. There is therefore a high probability of the method according to the invention contributing to stabilization of the network.

In the second stage of the method, a first option is to increase the reactive current that is fed in beyond a limit which is provided for normal operation by increasing the nominal value for the voltage. This makes it possible to increase the proportion of the reactive current without having to reduce the real current. The terms real current and reactive current are used as synonyms for the real component and reactive component of the volt-amperes that are generated; a person skilled in the art will be aware that there are other representation options, such as the phase angle $\phi$ between the current and the voltage, or the cosine of this angle. Although the electricity generating installation may become overloaded by increasing the nominal value for the voltage, this is, however, acceptable for a short time period.

A second option for the second stage of the method according to the invention is to increase the reactive current that is fed in beyond a limit which is provided for normal operation by giving priority to feeding in reactive current over feeding in real current. In the first stage of the method according to the invention, and in precisely the same way as during normal operation, the real power feed has priority and the amount of reactive current that is fed in is only as much as is possible in addition to the real current. In this phase, it is sensible for the real current to have priority because the loads require a large amount of real power after the voltage dip. However, if the first stage of the method according to the invention is not sufficient to adequately stabilize the network, further measures are required. The invention proposes that priority now be given to feeding in reactive current rather than feeding in real current. Admittedly, at first glance, it appears to be counter-intuitive to reduce the amount of real current that is fed in after a network fault. However, the invention has identified that supporting the voltage makes the more important contribution to stabilization of the network. This is because the voltage in an electricity distribution network is quite a local phenomenon. In contrast, the frequency which is influenced by feeding in real current is a global phenomenon. This means that, if the real current decreases locally, then this can in many cases be coped with by a power station a long distance away. However, if the voltage dips locally, this cannot be compensated for by a power station a long distance away.

In the first stage of the method according to the invention, the priority of the real current is ensured by setting an upper limit for the phase angle $\phi$ between the current and the voltage. The limit may either be an expressly predetermined limit for the phase angle $\phi$ or a physical limit which acts in the same way as a limit for the phase angle $\phi$. If, for example, the maximum permissible current in the electricity generating installation is reached at a specific phase angle $\phi$, then this current limit acts in the same way as a limit on the phase angle $\phi$. The stabilization regulator can provide regulation up to the limit, but not beyond it. The limit is chosen such that the electricity generating installation can cope with the sum of the real current and reactive current. In order to avoid overloading of the electricity generating installation because of the increase in the limit for the phase angle $\phi$ in the second stage of the method according to the invention, it is necessary to ensure that the real current is reduced in parallel when the limit is exceeded and the reactive current that is fed in is increased. The reactive current that is fed in is therefore increased at the expense of the real current that is fed in.

The increase in the reactive current that is fed, as provided in the second stage of the method according to the invention, beyond the limit for the phase angle $\phi$ provided for normal operation can be carried out under the control of the stabilization regulator. It is also possible to deactivate the stabilization regulator again in the second stage of the method, and to increase the reactive current that is fed in, by other means.

The limit for the phase angle $\phi$ can be raised completely in the second stage of the method. The phase angle $\phi$ could then rise up to 90°, thus resulting in only reactive current being fed. In many cases, it is more expedient to define an upper limit for the phase angle $\phi$, and therefore a lower limit for the real component. If the electricity generating installation is a wind energy installation, then the lower limit can be defined as a function of the wind speed. It may also be expedient to reset the phase angle $\phi$ to the original value again as soon as a predetermined time period has elapsed or a predetermined limit for the voltage has been exceeded.

In one advantageous embodiment, the method according to the invention is extended to three stages. If the voltage has not be adequately stabilized within a first predetermined time period by the first stage of the method according to the invention, the nominal value for the voltage is first of all increased in a second stage. As described above, this results in the electricity generating installation becoming overloaded, which means that this state cannot be maintained in the long term. Once a second predetermined time period has elapsed since the increase in the nominal value, a check is therefore carried out once again to determine whether the voltage has been adequately stabilized. If this is not the case, an upper limit for the phase angle φ between the current and the voltage is raised in a third stage of the method according to the invention. This makes it possible to increase the reactive current that is fed in, at the expense of the real current that is fed in. In this state, the electricity generating installation makes its maximum possible contribution to supporting the voltage locally.

For normal operation, the stabilization regulator would have consequences which are undesirable. The method according to the invention therefore provides for the stabilization regulator to be switched off again at the appropriate time. One condition for deactivating the stabilization regulator may be that the actual value of the voltage exceeds a predetermined threshold. On the other hand, there is a risk of the stabilization regulator being able to further increase a voltage which rises suddenly after a fault has been cleared and which, for this reason, is already too high. Alternatively or additionally, the stabilization regulator can also be deactivated when a predetermined time period has elapsed since the occurrence of the network fault, or when it has been possible to keep the voltage within a predetermined band for a predetermined time period.

The electricity generating installation generally generates electrical power at low voltage or medium voltage. The electrical power which is generated at low voltage is normally also first of all transformed to medium voltage, before being transformed to high voltage for transportation over long distances. When low voltage is used for generation, the low voltage is directly influenced by the control loop, while the influence on the medium voltage and high voltage is indirect. When medium voltage is generated, the control loop directly influences the medium voltage, while the influence on the high voltage is indirect. In addition to the low voltage and the medium voltage, the high voltage can also be used as a reference variable for the control loop. If the high voltage is chosen as a reference variable, then this has the advantage that the regulation process is directly based on the variable which is finally relevant. Because of the stepping switch, the ratio between the medium voltage and the high voltage is generally not fixed. If the high voltage is used as a reference variable, then regulation shall take place at a value before the occurrence of the network fault and not at a generally defined value. In particular, this value may be the lower limit of the voltage band before the occurrence of the network fault. If the data relating to the medium voltage network and the characteristics of the transformer between the medium voltage network and the high voltage network are known, the electricity generating installations are able to calculate the high voltage. If a high-speed communication link is provided, the high voltage can alternatively be measured, and the measured values can be transmitted to the electricity generating installations.

As mentioned above, the voltage in the electricity distribution network is quite a local phenomenon. If a plurality of electricity generating installations take measures to support the voltage at the same time, then this can lead to the voltage briefly rising locally above the nominal value even though the network overall has not yet been stabilized again. The stabilization regulator starts to reduce the voltage again because the actual value is above the nominal value. This undesirable effect can be avoided by designing the stabilization regulator such that it can only raise the voltage.

As mentioned above, after a network fault has occurred, there is an increased risk of oscillatory fluctuations because the state of the electricity distribution network is not clear. For this reason, it is generally desirable to avoid sudden changes of components connected to the network. For the purposes of the invention, this idea has been initially precipitated by choosing a stabilization regulator which avoids sudden changes at the start of the method according to the invention. The same reasoning applies to the other changes to which the electricity generating installation is subject during the method according to the invention. These changes should not be carried out suddenly but continuously, extended over a time period, in a plurality of steps or over a ramp. This applies in particular to the nominal value of the voltage when it is reduced again to the normal value at the end of the method according to the invention, and for the stabilization regulator which should likewise not be deactivated suddenly at the end of the method. This also applies to the reduction in the real current when the limit for the phase angle φ has been raised, and to the subsequent increase in the real current again. If the electricity generating installation is a wind energy installation, then, when the real power is reduced, it may additionally be worthwhile adapting the pitch angle of the rotor blades in order to prevent acceleration of the rotor. In addition, the wattless component should also be reduced sufficiently slowly that the changes can be compensated for by other items in the network. In general, for example, the changes may be extended over a time period of at least 2 s, preferably at least 5 s, and furthermore preferably at least 10 s.

The invention furthermore relates to an electricity generating installation which is designed to carry out the method according to the invention. Against the background of the prior art cited initially, the electricity generating installation is distinguished, according to the invention, in that a stabilization regulator is provided whose step-function response rises over time and which is designed to regulate the voltage of the electrical power fed in as a function of a fed-back voltage signal. Furthermore, the control unit comprises an activation module, which activates the stabilization regulator after a network fault, as well as a detector for checking whether the voltage has stabilized once a predetermined time period has elapsed since the activation of the stabilization regulator. Finally, an actuating element is provided which increases the reactive current fed in beyond a limit which is provided for normal operation if the check by the detector indicates that the voltage has not yet been adequately stabilized. The elements of the control unit are expediently physically connected to one another. The elements may also be separated from one another.

The best example for a regulator with a rising step-function response is a so-called I-regulator, in which the regulation is based on an integrating element. The integrating element reacts to a constant sudden change with an output variable which rises in an unlimited form. By way of example, a similar effect can be achieved with a P-regulator, whose gain rises over time. The P-regulator responds with a sudden change to a constant sudden change. In the case of a regulator with a rising step-function response, the output variable increases ever further when the discrepancy remains between the nominal value and the actual value. For this reason, in practice, a variable which is set by a regulator having a rising step-function response must always be limited. In the case of the electricity generating installation according to the invention, this limit may be set, for example, by a value for the phase angle φ between the current and the voltage, which limit must not be exceeded.

The stabilization regulator according to the invention is active only following a network fault. During normal operation, the voltage is normally not subject to a closed control loop. If a closed control loop is also provided for the voltage during normal operation in one specific case, then the regulator is a simple P-regulator. After a network fault, the stabilization regulator according to the invention can be provided either in addition to or instead of the regulator for normal operation. If undesirable oscillations occur in the network after activation of the stabilization regulator, the weighting of the stabilization regulator relative to the weighting of the regulator for normal operation can be reduced, in order to damp the oscillation. It is likewise possible to reset the stabilization regulator at short notice and to switch to the regulator for normal operation when the voltage has risen above a certain limit. This allows overvoltages to be avoided. If it is found that the voltage has still not been adequately stabilized, the stabilization regulator can be activated again.

BRIEF DESCRIPTION OF THE DRAWINGS

The invention will be described by way of example in the following text using advantageous embodiments and with reference to the attached drawings, in which:

FIGS. 5 to 7 show various embodiments of the method according to the invention.

DETAILED DESCRIPTION OF THE INVENTION

Figure 1:
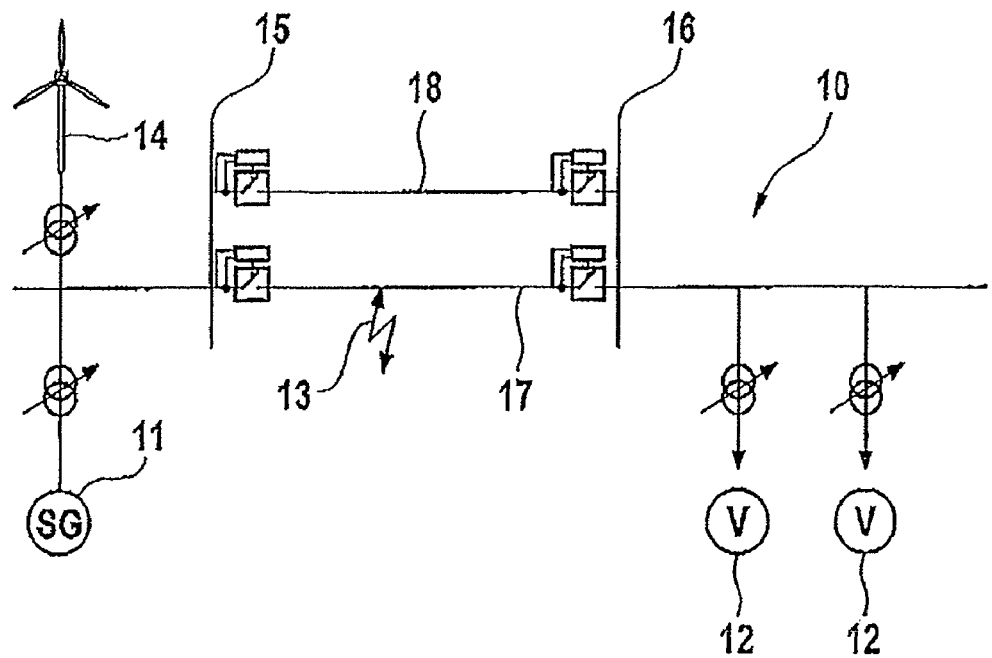
FIG. 1 shows an electricity distribution network with an electricity generating installation according to the invention.

A conventional power station 11 is connected to an electricity distribution network which is identified overall by the reference number 10, in which power station 11 electrical power is generated with the aid of a synchronous generator SG. An electricity generating installation 14 according to the invention, which in this case is a wind energy installation, is likewise connected to the electricity distribution network 10 and feeds electrical power into the power distribution network 10 via a converter. The electricity distribution network 10 transmits the electrical power at high voltage to loads 12.

Between two switching points 15, 16, the electricity distribution network 10 branches into a first branch 17 and a second branch 18. An electricity distribution network in the form of a ring such as this is normal practice; this ensures that two switching points are not completely isolated from one another by the failure of one connecting line. If it is assumed that a short circuit has occurred at 13 in the first branch 17, then this leads to the voltage collapsing throughout the entire electricity distribution network 10. The voltage dip propagates within fractions of seconds from the location of the ground fault 13 to the conventional power station 11 and to the wind energy installation 14.

The switching points 15, 16 are designed such that they determine within 150 ms whether the ground fault has occurred in the first branch 17 or in the second branch 18, and clear the fault by isolating the relevant branch from the rest of the electricity distribution network 10. Once the voltage has collapsed to a value of, for example, 15% of the nominal voltage because of the ground fault, it then rises again very quickly once the fault has been cleared. However, the nominal voltage is not reached immediately again but, for example, a value of 80% of the nominal voltage. While the ground fault is present, it is particularly important not to isolate the conventional power station 11 and the wind energy installation 14 from the electricity distribution network. They cannot contribute much to supporting the voltage for as long as the ground fault is present. In the phase which immediately follows the clearing of the fault, a decision is made as to whether this is a total failure or whether the network has been stabilized.

Stabilization of the electricity distribution network 10 in this phase is not very simple because a reduced voltage in the high voltage network leads to the voltage at the loads also falling. The stepping switches in the transformers in which the electrical power is transformed down from the high voltage network for the loads are designed such that they change the transformation ratio to the high voltage when there is an excessively low voltage at the loads. This further loads the high voltage network and this can lead to a positive-feedback effect which destabilizes the electricity distribution network.

Figure 2:
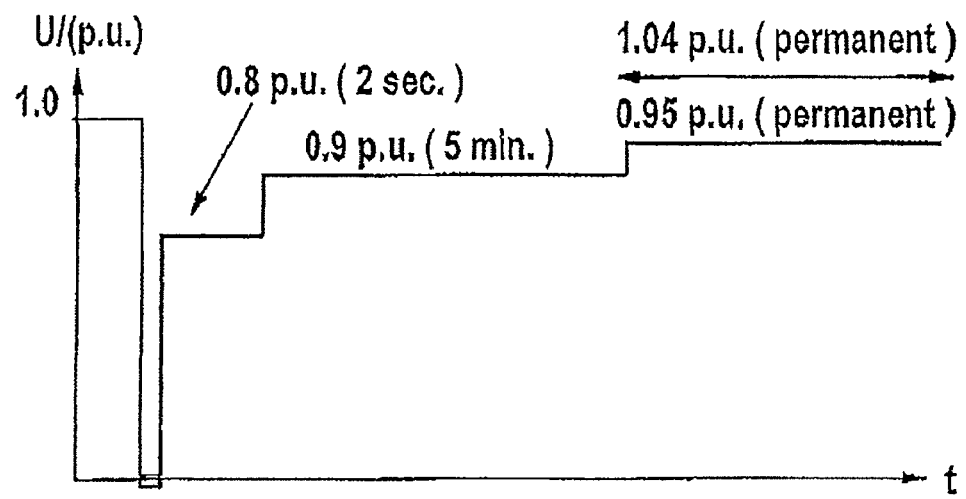
FIG. 2 shows a requirement for a generator, for the behavior after a network fault.

By way of example, FIG. 2 shows the requirements which the operators of electricity distribution networks place on the feeding generators for the behavior during and after a network fault. The figure shows the time profile which the voltage, which is plotted in relative units (p.u.) on the Y-axis, may have during a typical network fault. After a ground fault occurs, the voltage collapses from the nominal voltage (1.0 p.u.) to a fraction of the nominal value. After the fault has been cleared, the voltage may be 80% of the nominal voltage (0.8 p.u.) for 2 seconds, followed by 5 minutes at 90% of the nominal voltage (0.9 p.u.) and then 95% of the nominal voltage (0.95 p.u.). The network operators' requirement for the electricity generators is that the feeding generators may be disconnected from the network only when the voltage is below the profile shown in FIG. 2. The feeding generators must therefore not be disconnected from the network when the voltage remains below 90% of the nominal voltage for more than 2 seconds after the fault has been cleared. Between 95% and 104% of the nominal voltage, the electricity generating installation must remain permanently connected to the network.

Figure 3:
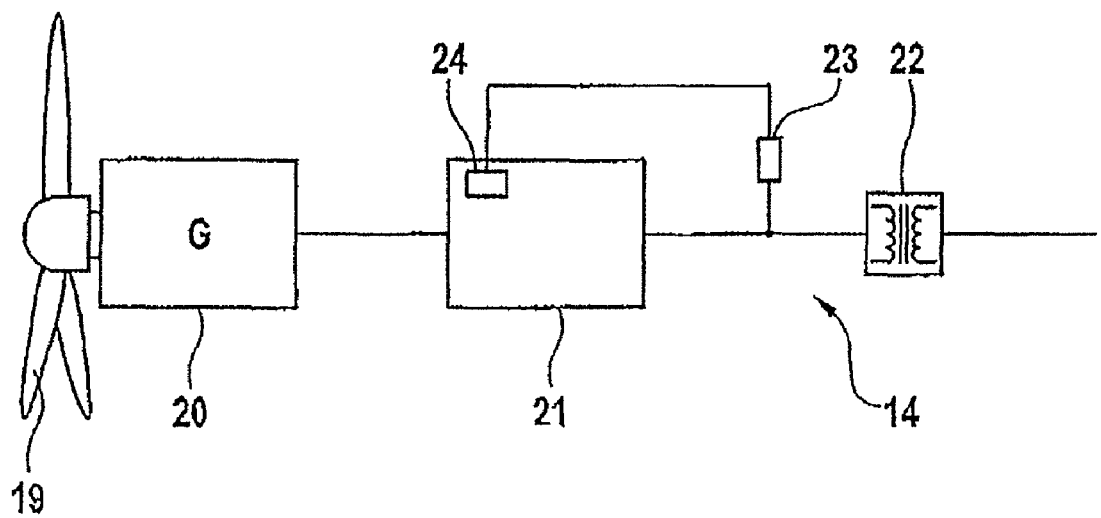
FIG. 3 shows a schematic illustration of an electricity generating installation according to the invention.

FIG. 3 shows, schematically, the design of a wind energy installation 14 according to the invention. The kinetic energy obtained by a rotor 19 is converted to electrical energy via a generator 20. The electrical power is transmitted to a transformer 22 via a converter 21. In the transformer 22, the electrical power is first of all transformed from low voltage to medium voltage, for further transportation. If a voltage dip occurs in the high voltage network, which is not illustrated in FIG. 3, then the voltage in the medium voltage network also falls, and this is transmitted via the transformer 22 to the low voltage side. A sensor 23 is provided in the wind energy installation 14, which measures the voltage at the output of the converter 21 and transmits a corresponding voltage signal to a converter controller 24. When a network fault is found, that is to say a voltage dip by more than 10% in less than 1 ms, then the method according to the invention is initiated.

Figure 4:
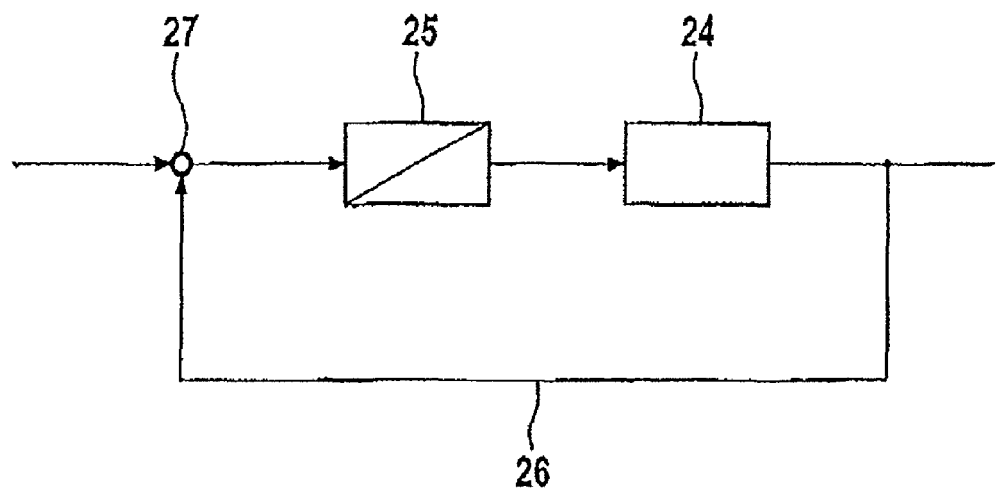
FIG. 4 shows a schematic illustration of a control loop with a stabilization regulator according to the invention.

In the first stage of the method according to the invention, a stabilization regulator 25, which is illustrated in FIG. 4, is activated. The stabilization regulator 25 is a component of a closed control loop in which, as indicated at 26, a signal relating to the voltage of the electrical power fed in is fed back. In this case, a signal relating to the low voltage at the output of the converter 21 is fed back, although the invention also covers a signal relating to the medium voltage or the high voltage being fed back. The fed-back voltage signal is compared at 27 with the nominal voltage as a reference variable, and the difference is supplied as an input variable to the stabilization regulator 25. The stabilization regulator 25 is an I-regulator, whose step-function response rises over time, that is to say its output variable increases, when the difference between the fed-back voltage signal and the reference variable lasts over a time period. The output variable also increases when the difference itself, as an input variable, does not increase. The step-function response of the stabilization regulator 25 is indicated in the circuit symbol in FIG. 4. The output variable of the stabilization regulator 25 is supplied to the converter controller 24 which influences the voltage as a function of the output variable and, in particular, increases the reactive component in order to support the voltage.

The overall profile of the method according to the invention is illustrated schematically in FIG. 5. Once the wind energy installation has been started up at 100, a check is continuously carried out at 120 to determine whether a network fault is present. If a network fault is found, the stabilization regulator 25 is activated at 140. While the stabilization regulator 25 is active, a continuous check is carried out at 160 to determine whether the voltage has been adequately stabilized again. An adequately stabilized voltage is assumed when the voltage is higher than 95% of the nominal voltage for a time period of more than 5 seconds. Another criterion for an adequately stabilized voltage could be that the voltage is higher than the lower limit of the voltage band in the high voltage network for at least 5 seconds. If a current is available, this voltage can also be calculated if the high voltage is measured or the medium voltage and the steps in the tap-changing transformer are known.

If the voltage has stabilized, the method according to the invention ends at 180, and the wind energy installation 14 reverts to the normal operating state. If the voltage has not been adequately stabilized within 2 to 10 seconds from activation of the stabilization regulator 25, then the second stage of the method according to the invention is activated at 200. In the second stage, the nominal voltage is in this exemplary embodiment increased by 5% above the previous nominal value, for example from 100% to 105%. The wind energy installation 14 can therefore feed in additional reactive current without having to reduce the real current. The stabilization regulator 25 is still active and now regulates the voltage at the new nominal value. A check is once again carried out at 210 to determine whether the second stage of the method according to the invention has led to adequate stabilization of the voltage. If this is the case, the method according to the invention ends at 180, and the wind energy installation 14 reverts to the normal operation state. The wind energy installation 14 can withstand the increased load caused by the increase in the nominal voltage for a time period of only 2 minutes. Once 2 minutes have elapsed, the method according to the invention ends at 220 even if the voltage has not yet been stabilized.

According to FIG. 6, the method according to the invention can also be carried out in an alternative form. Once again, after the start of the method at 120, continuous checking is carried out to determine whether a network fault is present and, if appropriate, the stabilization regulator 25 is activated at 140. A P-regulator which was responsible for voltage regulation up to this point is deactivated at the same time. If the actual voltage is below the nominal voltage, the stabilization regulator 25 receives the corresponding difference as an input variable.

The output variable rises when the difference remains for a time period. The converter 21 responds to a rising output variable from the stabilization regulator 25 by increasing the reactive component. While the output variable from the stabilization regulator 25 can in theory rise to a very major extent, the capability of the converter to increase the reactive component is limited. In the exemplary embodiment, the reactive component limit is set in such a way that the phase angle $\phi$ between the current and the voltage must not be greater than 18°. If the actual voltage is 80% of the nominal voltage, this difference leads to the limit of $\phi=18°$ being reached in less than 1 second.

If it is found at 160 that the increased reactive component has succeeded in stabilizing the voltage, the stabilization regulator 25 is deactivated again at 170, with the deactivation process extending over a time period of 10 seconds. Extending the deactivation of the stabilization regulator 25 over time reduces the risk of oscillations in the electricity distribution network 10.

If the first stage is not sufficient to stabilize the electricity distribution network 10, the second stage of the method according to the invention is initiated at 200 by raising the limit from $\phi=18°$. This leads to the feeding of reactive current having priority over the feeding of real current. With an appropriate output variable from the stabilization regulator 25, the converter can now go up to $\phi=90°$, which means that only a reactive current and no real current is now fed in. If this measure results in a reduction in the real power that is fed in, then the blade angle is increased if it is not possible in any other way to prevent a rise in the generator rotation speed. If the check at 210 shows that the stabilization of the voltage has been successful, the wind energy installation reverts to normal operation at 170 over a time period of 30 seconds. If it has not been possible to stabilize the voltage within 5 minutes, the wind energy installation is shut down, if necessary, at 215.

Figure 7:
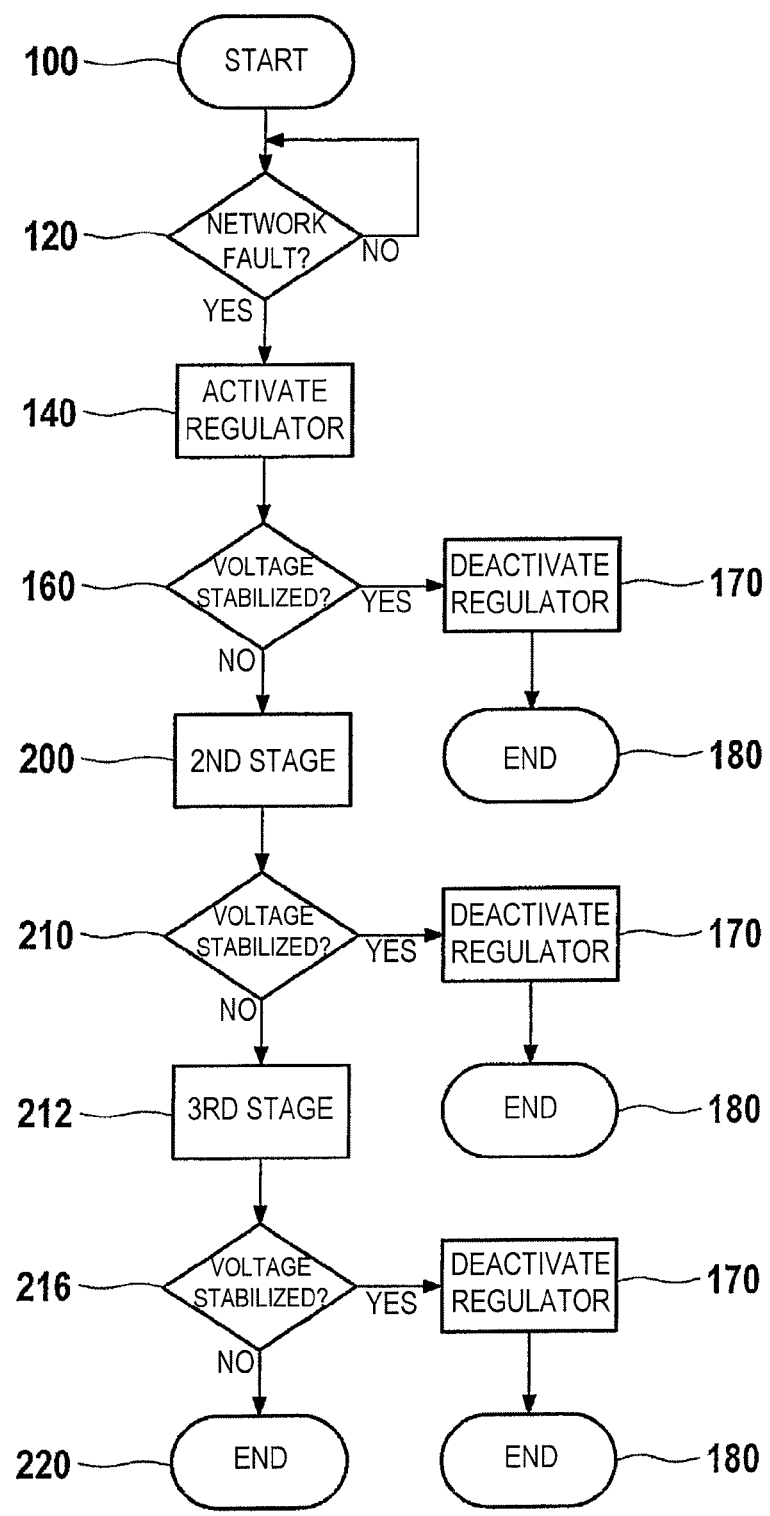

In the case of the alternative procedure shown in FIG. 7, the method according to the invention comprises three stages. The stabilization regulator 25 is first of all activated at 140, and a check is carried out at 160 to determine whether this measure is successful within the predetermined time. If this is not the case, a second stage of the method according to the invention is initiated at 200, and the nominal value for the voltage is increased. If this also does not lead to success within 2 to 10 seconds, the nominal value is reduced again to the normal value in a number of steps, within 10 seconds. At 212, the third stage of the method according to the invention is then initiated, and the limit for the phase angle $\phi$ is increased from 18° to 70°. At a phase angle of $\phi=70°$, by far the greatest proportion of the current fed in from the wind energy installation 14 is reactive current, and only a small proportion is still real current. Once the limit has been raised from $\phi=18°$, the phase angle is not increased suddenly, but continuously, in order to keep the risk of oscillations low. In parallel with the increase in the phase angle $\phi$, the pitch angle of the rotor blades is varied in order to prevent the rotation speed of the rotor from rising. This embodiment therefore provides a stepped reaction in three steps, in order to reduce the consequences of a network fault.

The invention claimed is:

1. A method for stabilizing an electricity distribution network, in which an electricity generating installation is connected to the electricity distribution network and feeds electrical power into the electricity distribution network via a converter, comprising:

detecting a network fault in the electricity distribution network;

activating a stabilization regulator in the electricity generating installation configured to regulate the voltage of the electrical power as a function of a fed-back voltage signal and whose step-function response is configured to rise over time;

checking whether the voltage has stabilized when a predetermined time period has elapsed since activation of the stabilization regulator; and increasing a reactive current feed beyond a limit which is provided for normal operation if the voltage has not yet stabilized.

2. The method of claim 1, wherein the reactive current feed is increased beyond the limit which is provided for normal operation by increasing a nominal value for the voltage.

3. The method of claim 1, wherein the reactive current feed is increased beyond the limit which is provided for normal operation by giving priority to feeding in reactive current over feeding in real current.

4. The method of claim 3, wherein an upper limit for a phase angle φ between current and voltage is raised.

5. The method of claim 3, wherein the electricity generating installation is a wind energy installation having a plurality of rotor blades, and wherein a pitch angle of the rotor blades is varied in parallel with a reduction in real power.

6. The method of claim 2, further comprising:

checking whether the voltage has stabilized when a second predetermined time period has elapsed since increasing the nominal value;

raising an upper limit for a phase angle φ between current and voltage if the voltage still has not yet stabilized.

7. The method of claim 1, further comprising deactivating the stabilization regulator when an actual value of the voltage exceeds a predetermined threshold.

8. The method of claim 1, wherein the stabilization regulator uses voltage on a high-voltage side as a reference variable.

9. The method of claim 8, wherein the stabilization regulator uses voltage on a high-voltage side before the occurrence of the network fault or a corresponding lower limit of a voltage band as a nominal value.

10. The method of claim 1, wherein the electricity generating installation is a wind energy installation.

11. An electricity generating installation which feeds electrical power via a converter into an electricity distribution network, comprising:

a stabilization regulator whose step-function response rises over time and which is configured to regulate the voltage of the electrical power as a function of a fed-back voltage signal;

a control unit comprising an activation module configured to activate the stabilization regulator after a network fault, a detector configured to check whether the voltage has stabilized after a predetermined time period has elapsed since activation of the stabilization regulator, and an actuating element configured to increase a reactive current fed in beyond a limit which is provided for normal operation if the voltage has not yet stabilized, wherein the electricity generating installation is configured to perform the method of one of claims 2 to 9.

12. An electricity generating installation which feeds electrical power via a converter into an electricity distribution network, comprising:

a stabilization regulator whose step-function response rises over time and which is configured to regulate the voltage of the electrical power as a function of a fed-back voltage signal;

a control unit comprising an activation module configured to activate the stabilization regulator after a network fault, a detector configured to check whether the voltage has stabilized after a predetermined time period has elapsed since activation of the stabilization regulator, and an actuating element configured to increase a reactive current fed in beyond a limit which is provided for normal operation if the voltage has not yet stabilized.

13. The electricity generating installation of claim 12, wherein the stabilization regulator is an I-regulator.

14. The electricity generating installation of claim 12, wherein the stabilization regulator is a P-regulator with time-dependent gain.

15. The electricity generating installation of claim 12, wherein the stabilization regulator is configured to have an exclusively voltage-raising effect.

* * * * *